United States Patent [19]
Cavallari

[11] 3,969,770
[45] July 13, 1976

[54] TWO-TRACK BIDIRECTIONAL CASSETTE HEAD FOR DATA HANDLING APPARATUS

[75] Inventor: Pier Giuseppe Cavallari, Novara, Italy

[73] Assignee: Honeywell Information Systems Italia, Caluso, Italy

[22] Filed: Feb. 23, 1973

[21] Appl. No.: 335,275

[30] Foreign Application Priority Data
Mar. 3, 1972 Italy .................................. 21345/72

[52] U.S. Cl. ................................. 360/121; 360/129
[51] Int. Cl.² ........................ G11B 5/27; G11B 5/10
[58] Field of Search .......... 179/100.2 MD; 360/122, 360/129, 121

[56] References Cited
UNITED STATES PATENTS

| | | | |
|---|---|---|---|
| 2,916,728 | 12/1959 | Gilson | 179/100.2 MD |
| 3,060,279 | 10/1962 | Harrison | 179/100.2 C |
| 3,590,168 | 6/1971 | Gooch | 179/100.2 C |
| 3,597,836 | 8/1971 | Tanzkz | 179/100.2 C |
| 3,603,941 | 9/1971 | Koorneet | 179/100.2 C |
| 3,610,839 | 10/1971 | Sand | 179/100.2 C |
| 3,710,036 | 1/1973 | Kohtani | 179/100.2 MD |
| 3,744,040 | 7/1973 | Honegger et al. | 179/100.2 C |

*Primary Examiner*—Vincent P. Canney
*Attorney, Agent, or Firm*—Fred Jacob

[57] ABSTRACT

A magnetic recording and reproducing head is provided for use in cassette applications. The head comprises a pair of tracks and is constructed such that the reading gap assigned to the first track is aligned with the recording and erasing gap assigned to the other track, the tracks being arranged reciprocally.

2 Claims, 3 Drawing Figures

TWO-TRACK BIDIRECTIONAL CASSETTE HEAD FOR DATA HANDLING APPARATUS

BACKGROUND OF THE INVENTION

It is known that new recording apparatus, called "cassette" recorders, having low cost, and limited performance and storage capacity, recently have been introduced into electronic data handling systems.

These cassette recorders are used, for example, as low-capacity storage means in computer terminals, or in small data handling systems, and as input means for loading programs and sets of data, in place of other more complex, bulky and expensive input-output apparatus such as card punchers and readers.

In the cassette recorders used in data handling devices, the information is recorded in digital form, according to methods such as the "Non Return to Zero" method, or preferably, the "Phase Modulation" method, which allows a higher recording density. The data is usually recorded on two parallel tracks, extending along the whole length of the tape, and a single-track magnetic head may be employed, which operates on one track at a time. It is usually required that the written information is capable of being immediately read out, for checking purposes: therefore the magnetic head usually comprises a writing and erasing transducer, and a reading transducer, arranged in succession at a small distance, and in this order with respect to the direction of the tape.

According to known arrangements, as soon as the recording and/or reading of a track has been accomplished, the cassette containing the tape is removed from the recorder and re-introduced therein after having been rotated 180°, so that the same head is used for recording or reading on the second track. This arrangement has several inadequacies.

In the first place, it must be kept in mind that data handling devices using tape cassettes drive the tape at higher speed than commercial and entertainment recording and playback devices. The speed of operation may be, for instance, 7 or 14 inches per second, corresponding to 19.5 or 39 cm per second respectively: therefore the time for recording or reading a whole track does not exceed respectively 8' or 4'.

The task of stopping the recorder, removing the cassette, rotating it by 180°, replacing the same into the recorder and restarting the operation on the other track involves a dead time, during which the apparatus is inactive. Such dead time, even if it may account only for a small percentage of the recording-reading time of a track, noticeably affects the overall performance.

Secondly, the manual inversion of the cassette, which usually is placed in a closed and dust-proof compartment, exposes the same to atmospheric agents and allows dust and other noxious external materials to enter and accumulate in the compartment, thus causing abrasion and damages to the tape, to the driving mechanism and to the magnetic head.

To remove such drawbacks it has been proposed recently, for instance, to equip the data handling cassette recorder with a magnetic head mounted on a rotatable support, capable of a rotation of 180°, by means of an electromagnetic control device for bringing the head in registration with the second track, thus avoiding the need for removing and replacing the cassette.

This arrangement involves contrivances, complex in design, and may impair the precision of the relative positioning of the head and the tape, mainly with respect to the orthogonality of the head gap to the direction of the tape.

SUMMARY OF THE INVENTION

The device according to the invention obviates such disadvantages by providing a composite magnetic head, suitable for recording and reading on two tracks having a mutually opposite running direction.

Multiple-track magnetic heads are known, which are usually designed for recording and reading several tracks running in the same direction at the same time.

The magnetic head according to the invention, on the contrary, is designed around a central symmetry pattern, which allows its bi-directional use, and is so arranged, that the reading gap assigned to the first track is aligned with the recording and erasing gap assigned to the other track, the tracks being arranged reciprocally, thus allowing a precise and stable registration of the mutual spatial relationship between the gaps and tracks.

In addition, this central-symmetry pattern reduces the number of component parts of the composite head, with obvious advantages for modular fabrication.

BRIEF DESCRIPTION OF THE DRAWING

These and other advantages and features of the invention will appear clearly from a detailed description of a preferred embodiment, having illustrating but not limiting purposes, and by the attached drawing, in which.

DESCRIPTION OF THE PREFERRED EMBODIMENT

Figure 1:
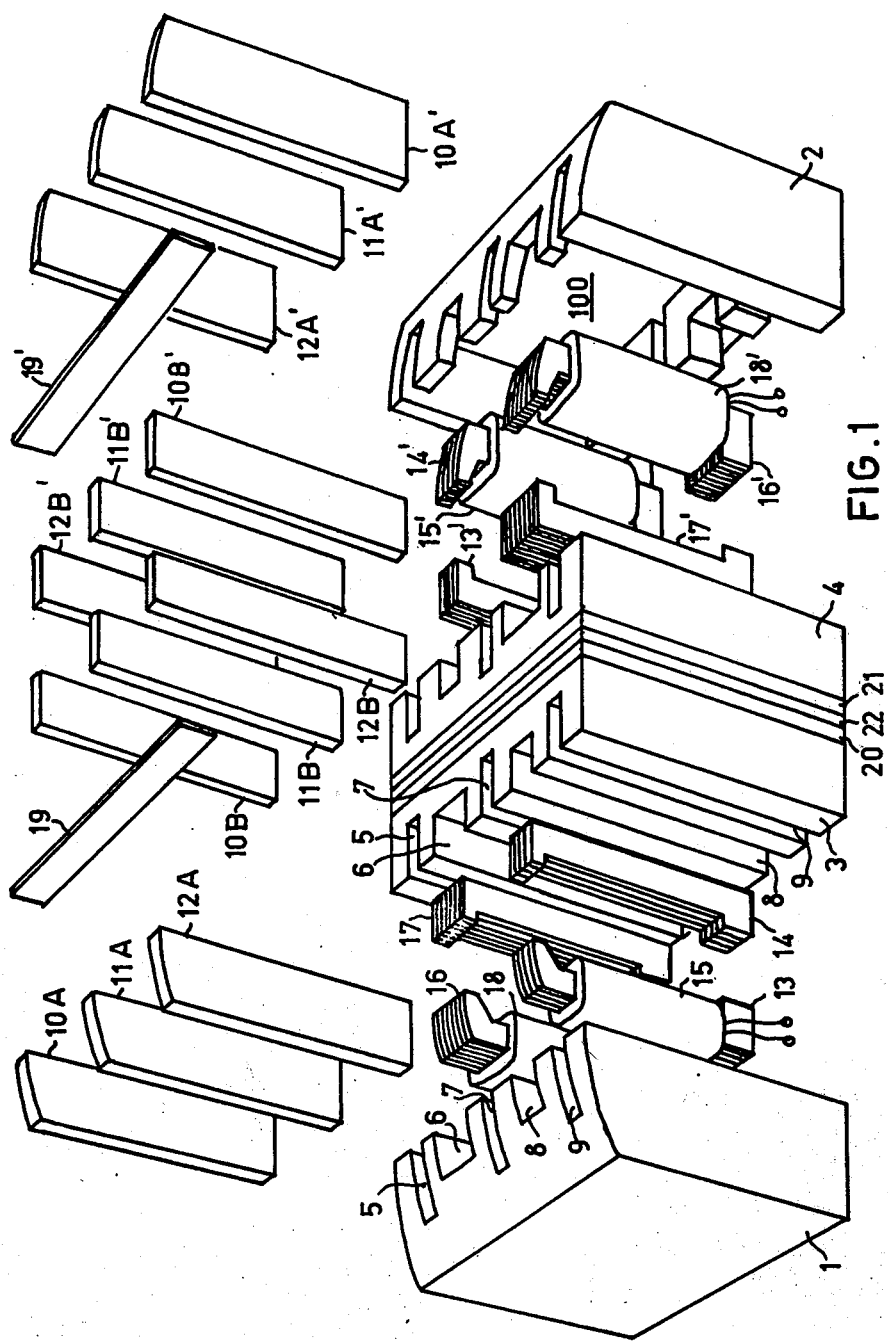
FIG. 1 is an exploded perspective view of a magnetic head according to the invention.

Referring now to FIG. 1, the mechanical structure comprises substantially four elements or half-shells 1, 2, 3 and 4, of a non-magnetic material having a relatively high electrical resistivity, such as bronze, which suitably contain the magnetic transducers and the related magnetic shields.

The external half-shell 1 is identical to the half-shell 2, and the internal half-shell 3 is identical to the half-shell 4.

Each external half-shell 1, 2 is provided with a surface juxtaposable with the corresponding surface of an internal half-shell 3, 4. On these surfaces, parallel vertical grooves 5, 6, 7 and 8 are cut, having suitable width and depth. The relative distances and dimensions of these grooves are such, that, when an internal half-shell is juxtaposed with the corresponding external half-shell, the different grooves of the external half-shell are in registration with the corresponding ones of the internal half-shell.

In the external half-shells 1, 2 the grooves are suitably widened and deepened in such a way, as to form internal cavities, or preferably, as shown in FIG. 1 by the half-shell 2, to form a single cavity 100 which may contain the coils of the magnetic transducers.

The outer grooves 5 and 9, and the central groove 7 have a reduced width, for instance 0.25 mm, and are provided for receiving thin sheets of magnetic material of high permeability, such as Mu metal, which form magnetic shields. The shields are indicated by reference numerals 10, 11, 12, and each one comprises a part A and a part B, one of which is located in a groove of an external half-shell and the other one in the corresponding groove of an internal half-shell.

The grooves 6 and 8, interposed between the former described grooves, have greater and different widths. The groove 6 may, for instance, have a width of 1.5 mm, and the groove 8 a width of 1 mm. The purpose of these grooves is to receive the magnetic circuit respectively for writing and erasing, and for reading.

The magnetic circuit of the reading transducers is formed by two cores 13 and 14, each one consisting of an assembly of suitably thin magnetic sheets and having oxidized surfaces, for providing reciprocal insulation and avoiding eddy currents in the magnetic circuit. Core 13 carries a reading coil 15.

In a similar way the magnetic circuit of the writing and erasing transducers is formed by two cores 16 and 17, each one formed by an assembly of magnetic sheets, as described above. The magnetic core indicated by 16 carries a coil 18 to which suitable electrical signals for writing or erasing, may be applied.

The two half-shells 1 and 3, completed with the related magnetic shields and cores, cemented and encapsulated in their respective half-shells by epoxy resins, are juxtaposed and cemented together by epoxy resins after the surfaces to be cemented have been suitably ground.

A sheet 19 of a non-magnetic material, preferably having good electrical conductivity, such as the material known as HAVAR, and of suitable thickness (for instance 2.5 micron), interposed between the half-shells before cementing, in proximity with the upper face of the half-shells, provides the magnetic gap both for the writing and erasing transducer of the first track and for the reading transducer of the second track.

The identical structure is formed by the two half-shells 2 and 4, completed with the related shields, magnetical circuits, and magnetic gaps, indicated by the same reference numerals, provided with prime accent.

These two parts of the magnetic head, thus assembled, are cemented together after juxtaposition of the internal half-shells, back-to-back, with the interposition of one or two magnetic shields and, in some cases a non-magnetic bronze separating sheet. In FIG. 1 two such magnetic shields are indicated by reference numerals 20 and 21 and the bronze sheet by 22. As the two parts of the magnetic head are mutually identical, their juxtaposition by homologous surfaces of the internal half-shells provides an arrangement having a central symmetry with respect to an axis normal to the surface for writing and, reading and erasing, as evidenced by FIG. 2.

Figure 2:
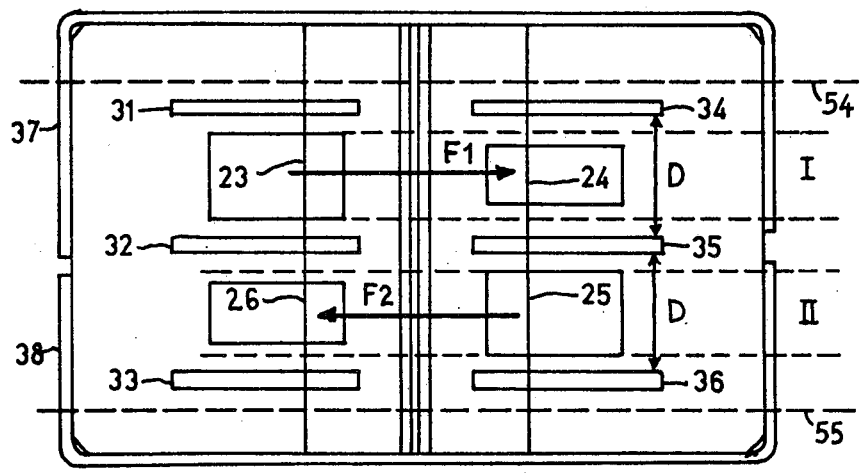
FIG. 2 is the front view of the face of the magnetic head which comes in contact with the magnetic tape.

FIG. 2 shows the front surface of the magnetic head which comes in contact with the magnetic tape, whose edges are indicated by the dashed lines 54 and 55. The magnetic tape may be driven in either of the two directions indicated by the arrows $F_1$ and $F_2$. It may be seen that the writing-erasing gap 23 and the reading gap 24 are aligned on the first magnetic track I in the direction of the motion of the tape, and follow each other in this order at a short distance along the direction indicated by the arrow $F_1$.

The erasing-writing gap 25 and the reading gap 26 are also aligned on the second magnetic track II, and follow each other in this order at a short distance, along the direction of the motion indicated by the arrow $F_2$.

The magnetic head described is therefore suitable for the recording and the immediately subsequent reading out of the written information on the track I, in order to check the written information, when the magnetic tape runs in the direction $F_1$; and for the recording and the immediately subsequent checking of the written information on the track II when the tape runs in the opposed direction $F_2$. Therefore, there is no need of inverting the cassette for changing the track.

It may be noted that the writing/erasing gap of the head 23 and the reading gap of the head 26 are provided by the same sheet of non-magnetic material, and are therefore in precise alignment. The same holds for the writing/erasing gap of the head 25 and the reading gap of the head 24. Both pairs of gaps are obtained by precisely machining and assembling the composite head, and therefore the operation of assuring the precise spatial relationship between each of the four gaps and the related portion of the tape is very simple and reliable.

As stated, the magnetic circuits for writing and erasing, have a different width than those for reading, and the same holds for the corresponding gaps.

This difference in width of the gaps is due to the need for allowing a measure of transverse clearance between the reading gaps and the track. It may occur through a small transverse displacement of the tape with respect to the head that in the region proximal to the edges of the tracks, subsequent operation of recording and erasing may not be perfectly superimposed, so that in these regions there may remain residuals of the preceding recording. Therefore, it is convenient to limit the reading region to the central part of the track, so that the magnetic condition of the edges does not affect the reading.

It may also be noted that, in FIG. 2 it is clearly shown that the magnetic shields indicated by 31, 32, 33, 34, 35 and 36 are spaced in the transverse direction by the same distance D. That arrangement may be conveniently modified, without difficulty.

Figure 3:
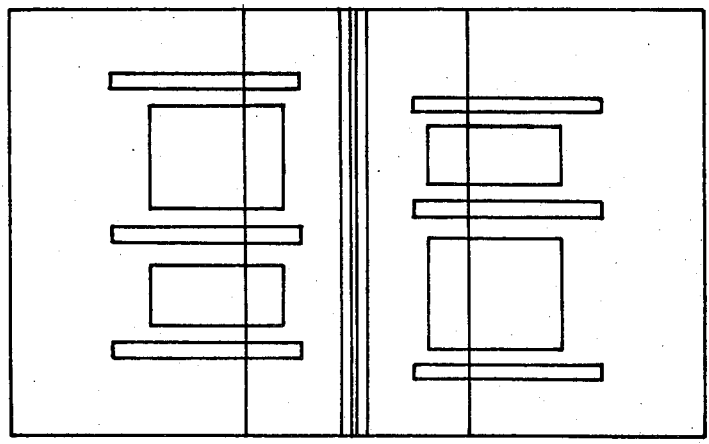
FIG. 3 is the front view of the same face of the magnetic head according to a variant of the preferred embodiment.

FIG. 3 shows a variant of the embodiment, by which the magnetic shields have different reciprocal distances. By such arrangement, and by suitably choosing the thickness of the magnetic circuits, and therefore the width of the gaps, it is possible to insure that the edges of the track are substantially aligned in the direction of the motion, with the magnetic shields at the sides of the reading transducer.

Therefore, the magnetic flux at the edges of the track is conveyed into these shields, thus reducing the transverse flux leakage, and consequently the noise induced into the reading transducer by the unfavorable magnetizing conditions of the edges, due to imperfect superposition of writing and erasing operations, is substantially reduced.

To complete the description, attention may be drawn to the fact that the magnetic composite head is provided with a suitable external magnetic shield, for example formed by the two C-shaped members of ferromagnetic material, indicated in FIG. 2 by the reference numerals 37 and 38, which enclose the head, with terminals for connection to the coils, not shown in the figure, and also with means for fastening the head to the apparatus to which it pertains, which also are not shown. These means are not considered to be essential for an understanding of the invention, and therefore are not described.

What is claimed is:

1. A two track bidirectional magnetic head for writing, erasing and reading out information on a first track of a magnetic support in motion in a first direction with respect to said head, and on a second track parallel to said first track of said magnetic support in motion in a second opposite direction, comprising: a first write-erase transducer and a first read-out transducer for operating on said first track, respectively provided with a first write-erase gap and a first read-out gap, arranged in transverse relationship to said tracks, a second write-erase transducer and a second read-out transducer for operating on said second track, respectively provided with a second write-erase gap and a second read-out gap, arranged in transverse relation to said tracks, and magnetic shields to prevent interaction between said transducers, wherein the shields encompassing each reading transducer are spaced apart by a distance substantially equal to the width of the gap of the write-erase transducer operating on the same track, wherein the first write erase gap is aligned with the second read-out gap, said second write-erase gap is aligned with said first read-out gap, non-magnetic structural means for enclosing and supporting said transducers and said shields, including two mutually identical external supporting members, and two mutually identical internal supporting members arranged symmetrically with respect to a central plane for holding said transducers and said shields in a centrally symmetrical pattern around a central axis contained in said central plane.

2. The two-track bidirectional head of claim 1, wherein said first write-erase gap and said second read-out gap are formed by a first single elongated thin sheet of non-magnetic material, extending from said first write-erase transducer to said second read-out transducer, and said second write-erase gap and said first read-out gap are formed by a second single elongated thin sheet of non magnetic material, extending from said second write-erase transducer to said first read-out transducer.

* * * * *